Patented May 17, 1932

1,858,369

UNITED STATES PATENT OFFICE

HARRY K. LINZELL, OF LA GRANGE, AND HERMAN A. SCHOLZ, OF OAK PARK, ILLINOIS, ASSIGNORS TO UNITED STATES GYPSUM COMPANY, OF CHICAGO, ILLINOIS, A CORPORATION OF ILLINOIS

PLASTIC PAINT

No Drawing. Application filed November 21, 1928. Serial No. 321,028.

This invention relates to a plastic composition adapted to be applied to a wall for protective and decorative purposes, as a crack filler or patching material for various articles, as an adhesive for setting title or the like, and as a plastic molding composition.

Owing to the low plasticity of Keene's or anhydrous gypsum cement when mixed with water it has heretofore been throught impossible to use same for a wall coating to be applied by a brush unless lime were mixed with the anhydrous gypsum to increase its plasticity and workability with the trowel. By reason of our discovery of a special method of treating dead burned gypsum or Keene's cement by exceedingly fine grinding of all or a portion of same, we are enabled to prepare a plastic paint which has very high plasticity and which can be readily textured to produce many fine wall decorative effects.

An object of this invention, therefore, is to provide a plastic composition of high plasticity which can be readily applied to a wall by means of a brush or trowel, or can be used for other purposes.

A further object of the invention is to provide a plastic paint which contains anhydrous gypsum as a base and which has the accelerating or hardening agent so adjusted that the proper hardening of the mixture on the wall is obtained.

Our improved composition for plastic paint includes a base of dead burned gypsum or Keene's cement, some of which is ground to ultra-fineness; a material to add to the consistency of the mixture or enable same to take up more water, such as dextrinized corn flour or other material preferably of a starchy or farinaceous nature which will accomplish the same result; and an accelerator to cause the setting and hardening of the dead burned or anhydrous gysum. Other materials may be added if desired, such as fine ground asbestos to increase the texturability of the composition and fillers and extenders such as fibrous talc and powdered mica, these also giving special rough effects to the wall coat when hard. When Keene's cement is used, it usually contains its own accelerator.

One of the many possible examples of our improved composition is as follows:—

|  | Per cent |
|---|---|
| Dead burned gypsum substantially passing 100 mesh screen | 33.75 |
| Dead burned gypsum ground to ultra-fineness so as to pass a 325 mesh screen | 33.75 |
| Fine ground asbestos | 3.00 |
| Dextrinized corn flour | 3.00 |
| Granular gum arabic (passing 20 mesh screen) | 4.5 |
| Potash alum, granular (passing 20 mesh screen) | 1.00 |
| Aluminum sulphate, crystalline (passing a 20 mesh screen) | 2.00 |
| Fibrous talc (powdered) | 5.00 |
| Mica (powdered) | 14.00 |
|  | 100.00 |

It should be understood that the use of coarsely ground dead burned gypsum passing 100 mesh, asbestos, talc and mica are optional and comparatively good results can be obtained without their use although certain advantages result from their use.

In the above formula, the dead burned gypsum mentioned is prepared from pure gypsum rock by burning same at a high temperature of about red heat for several hours. The resulting completely anhydrous calcium sulphate is then pulverized so that approximately 90% to 100% of same passes through a 100 mesh screen. For the preparation of the dead burned gypsum which is ground to ultra-fineness, some of this previously ground dead burned gypsum is further reduced and ground by placing same in a pebble mill or other suitable grinding means for a sufficient length of time that 90% to 100% of same passes through a 325 mesh screen. The portion which passes through this 325 mesh screen is ultra-fine, that is a large portion of it is much finer than the 325 mesh and approaches colloidal fineness. This fine grinding action greatly increases the plasticity of the dead burned gypsum and is considered one of the essential features of our invention. During the preparation of this dead burned gypsum and during its admixture with the remaining ingredients of the composition, moisture is substantially excluded so that the gypsum is in a completely anhydrous form at all times.

While the above proportion represents a preferred form of composition, the proportions of ultra-fine anhydrous gypsum to ordinary ground dead burned gypsum may be varied to a considerable extent, using as high as all ultra-fine material and none of the coarser material as one extreme and 75% of the total dead burned gypsum of a coarse mesh with the remainder of the ultra-fine gypsum, as the other approximate extreme. Furthermore, the total proportion of dead burned gypsum, both coarse and fine, may be varied to a considerable extent, using as low as 50% and as high as 95% with a corresponding variation of the other constituents to allow for these changes.

The asbestos is for the purpose of giving sharper textures and slightly greater coverage. Less than the specified amount can be used with a corresponding smoother surface and a lower coverage, and as before stated, this asbestos can be completely eliminated if desired. The asbestos can be of a variety known as "float" which practically all passes a 20 mesh screen, or if other asbestos is used, it should be ground or screened so as to pass this specification.

The dextrinized corn flour may be increased to 5% and lowered to 1%, while other farinaceous materials such as dextrinized or partially dextrinized starches and flours or "soluble starches" may be substituted for corn flour. These farinaceous materials take up 10–20 parts by weight of water to form gels. When plastic paints are applied to walls, such as to wallboard, the paper cover of these wallboards soak up a certain amount of moisture from the plastic paint composition. The advantage of the corn flour is that it is in the general class of water retaining materials, and permits a greater amount of water to be added to the mixture so that the anhydrous gypsum will set to the hydrated form and will have plenty of water for this setting action, thus preventing conditions technically known as "dry outs".

The 20 mesh of the gum arabic specified is important as it is desirable not to have the gum arabic so fine that it goes into solution too rapidly when water is added to the composition. By having the gum arabic ground rather coarsely, the tendency for the whole formula to form into lumps when water is added is largely avoided. Certain other natural water soluble gums and several synthetic water soluble gums of the dextrinized starch variety, or partially dextrinized starch variety, may be substituted for gum arabic. As high as 6% may be used and as low as 1%, the higher quantity increasing the adhesion and stickiness and resistance to water, and the lower quantity reducing these characteristics.

The potash alum and aluminum sulphate are both accelerators for hastening the hydration of the dead burned gypsum and either one may be used alone, but the best results are obtained when using them in the proportion indicated. Potash alum gives a more rapid acceleration of the set of the dead burned gypsum but tends to cut down the wet life of the water mixture if used alone. Aluminum sulphate is effective in causing the set and hardening, but does not allow it to take place as rapidly which is a desirable feature. If aluminum sulphate is used alone, map tracking results. The grading through a 20 mesh screen may be changed slightly, making it slightly coarser or finer, but increasing the fineness does not allow retempering for quite such a long period after the initial mixing of the water into composition, whereas making it coarser does not permit all of the accelerator to go into solution and thus tends to give trouble because of slow setting of the composition. Other accelerators well known to the art may be used such as sodium, potassium, ammonium, zinc and cadmium sulphates; the nitrates and chlorides of these metals may be used but are not as effective.

The fibrous talc may be increased to 15% or may be eliminated entirely, or in its place may be substituted ordinary talc, pyrophyllite, clay, or other fillers which are not acted on by acid. This material acts as an inert filler and extender and also adds to the working qualities and texturability of the formula.

The mica or mica schist used in the formula may be either increased or decreased or entirely eliminated. It too, adds to the texturability of the formula and its use gives the resulting wall coating a richness of surface or roughness which is advantageous especially if the surface is afterwards colored with a glaze of some variety. More or less of this ingredient may be used if desired, and flaked pyrophyllite may be substituted.

The above ingredients of our improved composition are mixed together as a dry powder and shipped as such. The customer using the material mixes it to a paste with water, and applies it with a brush or trowel to the wall surface, after which it is textured by any of the well known methods known to the trade. It dries and hardens by a combination of the setting action of the dead burned gypsum aided by the hardening action of the rice flour and gum arabic. Many fine and beautiful results may be obtained by the use of this material on walls where decorative results are desired. The cost of our composition is also comparatively low, so that great wall coverage can be obtained rather inexpensively.

While the above description represents certain embodiments of our invention, we do not wish to limit ourselves precisely to these details, since manifestly the same can be considerably varied without departing from the spirit of the invention as defined in the appended claims.

Having thus described our invention, we claim as new and desire to secure by Letters Patent:

1. A plastic composition including a mixture of dead burned gypsum coarsely ground so that 90–100% of same passes a 100 mesh screen and dead burned gypsum ground so that 90–100% of same passes a 325 mesh screen, a farinaceous substance, a water soluble gumlike hardening substance, and an accelerator, the dry mixture being adapted to be mixed with water and harden upon drying.

2. A composition of matter including a substantial quantity of dead burned gypsum ground so that 90–100% of same passes a 325 mesh screen, a farinaceous material, a water soluble gum, an accelerator, and water, the mixture being adapted to set upon drying.

3. A composition of matter including anhydrous gypsum ground so that 90–100% of same passes a 325 mesh screen, asbestos, a farinaceous material, a water soluble gum hardener, an accelerator, talc, and mica, the composition being adapted to be mixed with water and set upon drying.

4. In a plastic paint, a substantial proportion of anhydrous gypsum ground so that 90–100% of same passes a 325 mesh screen, a farinaceous substance, a water soluble gum hardener, an accelerator, the accelerator being coarsely ground to pass a 20 mesh screen, the composition being adapted to be mixed with water so as to set and form a wall coating.

5. In a composition of matter, a substantial proportion of coarsely ground Keene's cement passing a 100 mesh screen, a substantial proportion of Keene's cement passing a 325 mesh screen, a farinaceous substance, a water soluble gum hardener, and water, the mixture being adapted to set upon drying.

6. A composition of matter containing the following ingredients in substantially the proportions named; anhydrous gypsum coarsely ground, 33.75%; anhydrous gypsum, ground to ultra-fineness, 33.75%; fine ground asbestos 3%; a farinaceous material 3%; granular gum arabic 4.5%; potash alum, 1%; aluminum sulphate, 2%; fibrous powdered talc, 5%; powdered mica, 14%; the mixture being adapted to be mixed with water, and set upon drying.

7. A plastic wall composition including 50% to 95% of a mixture of coarsely ground 100 mesh anhydrous gypsum and 325 mesh anhydrous gypsum, a farinaceous material, a hardening gum, an accelerator, powdered talc, and powdered mica, the mixture being adapted to set to form a hard wall coating.

8. A composition of matter including 50% to 95% of a mixture of anhydrous coarsely ground 100 mesh gypsum and anhydrous gypsum ground to substantially passing a 325 mesh screen, asbestos, a farinaceus material, gum arabic, potash alum, aluminum sulphate, fibrous powdered talc, powdered mica, and water.

9. A composition of matter including a substantial proportion of anhydrous gypsum, ground to susbtantially passing a 325 mesh screen, a farinaceous substance, a gum hardener, a mixture of potash alum and aluminum sulphate, and a filler, the mixture being adapted to be mixed with water and set to form a hard substance.

10. A dry composition of matter containing a substantial quantity of dead-burned gypsum ground so that 90–100% of same passes a 325 mesh screen, a farinaceous substance, a water soluble gum hardener, and an accelerator, the mixture being adapted to being mixed with water to produce a product having high plasticity which hardens upon drying.

HARRY K. LINZELL.
HERMAN A. SCHOLZ.